Patented Dec. 5, 1939

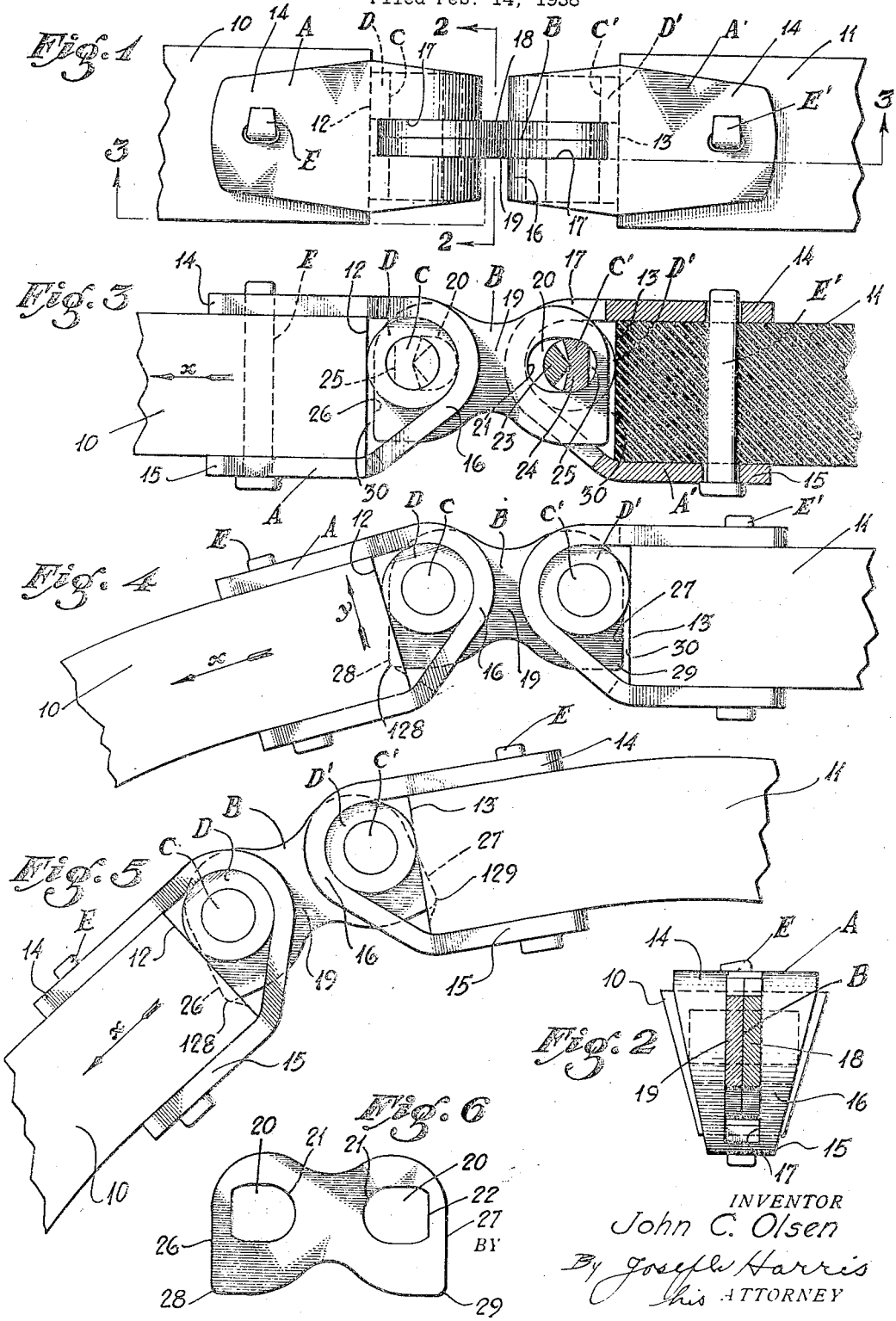

2,182,232

UNITED STATES PATENT OFFICE 2,182,232

BELT FASTENER

John C. Olsen, Chicago, Ill., assignor to Flexible Steel Lacing Company, Chicago, Ill., a corporation of Illinois Application February 14, 1938, Serial No. 190,398

1 Claim. (Cl. 24—33)

This invention relates to improvements in belt fasteners.

As well known to those skilled in the art, one of the most serious difficulties constantly encountered in the use of belt fasteners of the flexible or hinged types, is the so-called "whipping" action that takes place each time the fastener on the belt enters the pulleys. Said whipping action is due to the sudden snapping out or kicking out of the leading or advance belt end and immediately attached parts as the same are deflected from the straight or tangent path of travel to that of the circular path of travel upon entering the pulley. The result of such whipping action is an excessive movement about the hinge pin or the rocker hinge pins of the fasteners with consequent excessive wear and shortened life of the fastener.

One object of the present invention, therefore, is to provide simple, inexpensive and efficient means for eliminating or at least reducing to a practical minimum, the whipping or kicking out action of belt fasteners hereinbefore referred to and, more particularly, in connection with fasteners for V or side driving belts.

More specifically, an object of this invention is to provide simplified means for restricting the whipping action in that type of flexible V-belt fastener employing links, such means being characterized by the fact that the usual inherent resiliency of the material of which the belt is comprised, is availed of in cooperation with the fastener link or links in accomplishing the desired result.

Other objects of the invention will more clearly appear from the description and claim hereinafter following.

In the drawing forming a part of this specification, Figure 1 is a top plan view of the adjacent ends of a V-belt showing the improvements in connection therewith. Figure 2 is a vertical, transverse sectional view, corresponding substantially to the line 2—2 of Figure 1. Figure 3 is a part side elevational view, part longitudinal section of the construction shown in Figure 1, the section corresponding to the section line 3—3 of Figure 1. Figure 3 illustrates the relative positions of the parts as the fastener and belt are traveling in a straight or tangent path. Figure 4 is a side elevational view of the improved arrangement showing the relative positions assumed by the parts as the leading or advance belt end and attaching member first enters a pulley. Figure 5 is a view similar to Figure 4, but illustrating the positions of the parts of the fastener assumed after both belt ends have entered the pulley. And Figure 6 is an elevational view of the improved link of the fastener, shown detached.

In said drawing, the two ends of a belt are indicated at 10 and 11, the former being what may be termed the advance or leading end of the belt which is assumed to be traveling in the direction indicated by the arrow x in Figures 3, 4 and 5. The belt, as shown, is of V cross section and, as customary with V driving belts, the material thereof will ordinarily consist of rubber with embedded fabric or cord so as to be of an inherently resilient nature, as conventionally indicated by the cross section of the belt shown in Figure 3. Further, in carrying out the present invention, the extreme ends of the belt will be cut square, as indicated at 12 and 13.

The improved fastener, as shown, comprises two attaching members A, A'; a double link B; rocker hinge pins C, C'; and bearings or bushings D, D'. The attaching members are adapted to be secured to the respective belt ends by suitable means such as the relatively heavy pins or securing elements E, E', the latter being extended radially through alined apertures in the inner and outer arms of the attaching members and extended radially through the belt material.

Each of the attaching members A, A', as shown, is of bail-like formation having an outer and wider arm 14 and an inner narrower arm 15 connected by a rounded bight 16 of tapered form, as best shown in Figure 2. Each of the rounded bights 16 is centrally apertured, as indicated at 17, for the reception of the ends of the link B therein, as clearly shown.

The link B, preferably consisting of two relatively thin plate-like stampings 18, 19, as best shown in Figures 1 and 2, is provided, at each end thereof, with an aperture 20—20, each of which, nearest the longitudinal center of the link, is rounded, as indicated at 21 and is of elongated form with a flat outer edge as indicated at 22.

Each of the rocker hinge pins C, C' preferably consists of two elements 23 and 24 adapted to rock on each other, as best indicated in Figure 3, said elements in turn having bearing in the bearings or bushings D, D', as the case may be. Each of the hinge pin sections 24 is provided with a notch, as indicated at 25 with which cooperates the flat edge 22 of the link, as will be apparent. The bearings or bushings D are seated within the apices of the bights 16, as clearly shown in the drawing. Any suitable type of hinge pin may be employed, that shown being quite similar to the rocker hinge pin illustrated and claimed in my prior Patent No. 2,034,828, granted March 24, 1936, to which reference may be had for a more detailed description thereof.

The link B is of special form. As shown, the same is formed at each extreme end thereof with preferably flat or straight edges 26 and 27, the same extending at right angles to a line passing through the axes of the hinge pins and substantially parallel to the squared ends 12 and 13 of the belt ends. The material of the link is extended downwardly, as shown in Figure 6, that is, to what is the inner side of the belt when on the pulleys so that there is formed, at the lower corners thereof, shoulders 28 and 29 at a much greater distance from the respective axes of the hinge pins, than are the nearest or upper portions of said straight edges. It will also be seen that said corner shoulders 28 and 29 are at a materially greater distance from the axes of the pivot pins than the shortest distance from said axes to the squared ends of the belt. Said corners 28 and 29 may be slightly rounded, as best indicated in Figure 6.

The link B is made of such length that, when the parts of the fastener are assembled and all are in normal or in straight position, as indicated in Figure 3, there is only a very slight space as indicated at 30—30 between the straight edges 26 and 27 of the link and the corresponding adjacent squared ends 12 and 13 of the belt ends. The corners 28 and 29 are so located, as best shown in Figure 3, that the same are comparatively near the angle formed between the squared belt ends and the lower arms of the attaching members where the latter begin to incline upwardly to form the bights, when the parts are in normal position, as shown in Figure 3.

As is well known to those skilled in the art, when a belt is traveling over pulleys, the forward or advance end of the belt and fastener tend to kick out suddenly as said end of the belt enters the pulley. More specifically, assuming the belt shown in the drawing to be traveling in the direction of the arrow x, as the belt end 10 and associated attaching member A enter the pulley, said end 10 and member A will tend to kick upwardly in the direction indicated by the arrow y in Figure 4 and to carry with it the hinge pin C and immediately associated parts interposed between said hinge pin and the member A. If this action were not restrained, an excessive movement about the rocker hinge pin C would take place and induce the highly undesirable whipping action hereinbefore referred to. However, with the link B formed as shown and described, as soon as the leading belt end 10 and corresponding attaching member A have been deflected from the tangent or straight line merely sufficient to close the small gap or space 30, it is evident that the shoulder or corner 28 at the advance end of the link B will engage the resilient material of the belt end and further turning or angling movement between said advance end 10 of the belt and attaching member A, on the one hand, and the link B, on the other hand, will be gradually and progressively yieldingly resisted by the corner or shoulder 28 of the link being gradually further embedded within the resilient material as indicated by the position 128 in Figure 4.

As said yielding resistance to the continued angular movement between the link B and the leading attaching member A is gradually increased, the link is gradually induced to turn or angle on the trailing hinge pin C' and a similar action induced between the link B and the rear or trailing belt end 11 until the condition is reached as indicated in Figure 5, that is, where the rear shoulder or corner of the link occupies an embedded position as indicated at 129 within the resilient material of the belt end 11. The condition illustrated in Figure 5 is that wherein the fastener, considered as an entirety, and the belt ends are in full contact with the pulley or sheave. As will be apparent, as the fastener comes off of the pulley or sheave, the fastener will readily straighten itself out to the condition shown in Figure 3 due partly to the pull on the belt and partly to the resiliency of the belt ends as the fastener reaches the tangent and at which time the link is out of contact with the belt ends.

The arrangements shown and described serve to eliminate or at least reduce to a safe and practical minimum, the undesirable whipping or kicking out action hereinbefore referred to. Manifestly, the improvements can be incorporated at practically no additional expense in flexible belt fasteners of the type indicated in the drawing. In this connection, although the invention has been illustrated as applied to a relatively small size of V-belt employing only what may be termed a single link, it will be understood that the invention is equally applicable to other types of flexible belt fasteners wherein two or more links are employed. Furthermore, the invention is obviously adapted for other types of flexible connecting means than the specific type shown in the drawing and whether or not rocker hinge pins or ordinary hinge pins are used, so long as the essential feature is employed of having some part of the advance end of the flexible connection co-act with the inherent resilient material of the belt end after a predetermined deviation of the advance end of the fastener from a tangent has taken place, to yieldingly restrain further deviation. All changes and modifications are contemplated that come within the scope of the claim appended hereto.

What is claimed is:

The combination with the squared ends of a V-belt comprised of inherently resilient material; of two attaching members, each of bail-like formation; means securing said attaching members to the respective belt ends and with the bights of the attaching members spaced from the belt ends; a link extending between the bights of the attaching members; and hinge pins pivotally connecting the link with said bights of the attaching members, said link having squared ends normally disposed opposite and closely adjacent the squared ends of the belt when the belt is straight, said link being laterally extended in width at its ends to such an amount toward the inner, pulley-engaging side of the belt as to provide corner shoulders inwardly offset from a line joining the axes of the hinge pins that, upon a predetermined relatively small angular movement less than the total permissible angular movement between an attaching member with its associated belt end, on the one hand, and the adjacent end of the link, on the other hand, the corresponding adjacent corner shoulder of the link will engage with the belt end and, upon such increased angular movement, said corner shoulder will be progressively embedded in the end of the belt and progressively yieldingly restrained.

JOHN C. OLSEN.